United States Patent
Veilleux

(10) Patent No.: US 10,428,744 B2
(45) Date of Patent: Oct. 1, 2019

(54) FUEL PUMP HEALTH DETECTION

(71) Applicant: Hamilton Sundstrand Corporation, Charlotte, NC (US)

(72) Inventor: Leo J. Veilleux, Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 463 days.

(21) Appl. No.: 15/236,605

(22) Filed: Aug. 15, 2016

(65) Prior Publication Data

US 2018/0045122 A1   Feb. 15, 2018

(51) Int. Cl.
| | |
|---|---|
| *F02C 9/28* | (2006.01) |
| *F01D 21/00* | (2006.01) |
| *F02C 7/22* | (2006.01) |
| *F02C 7/262* | (2006.01) |
| *F02C 7/236* | (2006.01) |

(52) U.S. Cl.
CPC .............. *F02C 9/28* (2013.01); *F01D 21/003* (2013.01); *F02C 7/22* (2013.01); *F02C 7/236* (2013.01); *F02C 7/262* (2013.01); *F05D 2220/323* (2013.01); *F05D 2260/80* (2013.01); *F05D 2260/81* (2013.01); *F05D 2260/83* (2013.01); *F05D 2270/304* (2013.01); *F05D 2270/54* (2013.01)

(58) Field of Classification Search
CPC .... F02C 9/28; F02C 7/236; F02C 7/22; F02C 7/262; F01D 21/003; F01D 2220/323; F01D 2270/54; F01D 2260/81; F01D 2260/83; F01D 2270/304; F01D 2260/80
USPC .......................................................... 60/776
See application file for complete search history.

(56) References Cited

U.S. PATENT DOCUMENTS

| | | | |
|---|---|---|---|
| 2004/0230384 A1* | 11/2004 | Haynes | F04B 17/03 702/57 |
| 2005/0111988 A1 | 5/2005 | Griffiths | |
| 2007/0261384 A1 | 11/2007 | Flint et al. | |
| 2010/0257867 A1* | 10/2010 | Aurousseau | F02C 7/236 60/779 |
| 2012/0204572 A1* | 8/2012 | Bader | F01D 21/003 60/779 |
| 2016/0178464 A1* | 6/2016 | Burns | F02C 3/10 73/112.01 |
| 2017/0057667 A1* | 3/2017 | Ward | F04B 49/065 |
| 2018/0030851 A1* | 2/2018 | Emmons | F01D 17/12 |
| 2018/0030898 A1* | 2/2018 | Emmons | F02C 7/22 |
| 2018/0045122 A1* | 2/2018 | Veilleux | F01D 21/003 |

OTHER PUBLICATIONS

European Search Report for Application No. 17186104.0-1007 dated Jan. 8, 2018 (7 pp.).

* cited by examiner

*Primary Examiner* — J. Todd Newton
(74) *Attorney, Agent, or Firm* — Cantor Colburn LLP

(57) ABSTRACT

According to an aspect, a ground-based health test of a fuel pump of a fuel control system of a gas turbine engine is initiated. A starter speed of the gas turbine engine is determined while the ground-based health test is in progress. Fuel flow is initiated from the fuel pump to an ignition system of the gas turbine engine with the starter speed set below a nominal ground-based engine starting speed. A parameter of the gas turbine engine is monitored to verify light-off. A health status of the fuel pump is determined based on the starter speed at which light-off is achieved.

18 Claims, 4 Drawing Sheets

FUEL PUMP HEALTH DETECTION

BACKGROUND

This disclosure relates to gas turbine engine fuel systems, and more particularly to fuel pump health detection of a gas turbine engine using a variable speed start system.

Aircraft gas turbine engines typically receive pressurized fuel from gear-type fuel pumps. Gear pumps perform over a wide operational speed range while providing needed fuel flows and pressures for various engine performance functions.

Gear pumps often comprise two coupled gears of similar configuration and size that mesh with each other inside an enclosed gear housing. A drive gear may be connected rigidly to a drive shaft. As the drive gear rotates, it meshes with a driven gear, thus rotating the driven gear. As the gears rotate within the housing, fluid is transferred from an inlet to an outlet of the gear pump. Typically, the drive gear carries the full load of the gear pump drive or input shaft. The two gears may operate at high loads and high pressures, which may stress the gear teeth.

The volume of fluid pumped through the gear pump may partially depend on the geometry of the tooth (e.g., depth, profile, etc.), the tooth count, and the width of the gear. Larger volumetric output may be achieved when lower gear tooth counts with large working tooth depths and face width are used. Alternatively, higher volumetric output may be achieved with higher rotational speed of the pump. As the gears rotate, individual parcels of fluid are released between the teeth to the outlet. A common problem with more traditional gear pumps operating at high rotational speeds is cavitation erosion of the surfaces of the gear teeth. Cavitation erosion results in pitting of surfaces of the gear teeth that may eventually result in degraded pump volumetric capacity and affect pump operability and durability.

Fuel flow performance erosion is typically not detected until the start flow is not adequate to meet the required flow for engine starter assisted light-off speed (typically 10-20% engine speed) and acceleration of the engine. This can lead to a delay and/or cancellation of the flight. Prior to the inability to start on the ground with starter assist, the fuel pump would likely have been severely degraded for some prior period and would be unable to perform a windmill relight at altitude at aircraft speeds associated with engine windmill speeds without starter assist (typically 6-12% engine speed).

This undetected condition could lead to an inability to relight at critical points in the flight envelope without starter assist and is undesirable. It is critical for fuel pumps to be able to build up enough fuel pressure and flow to restart the engine in flight during windmilling conditions following an in-flight shutdown event. The windmilling condition for engine re-start is typically very low (8-10% of ground idle speed) compared to a nominal ground-based engine starting speed.

In addition to ground start and windmill relight potential issues, there is potential for inadequate pump fuel flow to make adequate takeoff thrust. Inadequate fuel flow may be detected during takeoff conditions and could lead to an aborted takeoff. To safeguard against this, fuel pumps are typically removed for maintenance at some periodic interval.

BRIEF DESCRIPTION

According to an embodiment, a method includes initiating a ground-based health test of a fuel pump of a fuel control system of a gas turbine engine. A starter speed of the gas turbine engine is determined while the ground-based health test is in progress. Fuel flow is initiated from the fuel pump to an ignition system of the gas turbine engine with the starter speed set below a nominal ground-based engine starting speed. A parameter of the gas turbine engine is monitored to verify light-off. A health status of the fuel pump is determined based on the starter speed at which light-off is achieved.

According to an embodiment, a fuel control system of a gas turbine engine is provided. The fuel control system includes a fuel pump and a controller. The controller initiates a ground-based health test of the fuel pump and determines a starter speed of the gas turbine engine while the ground-based health test is in progress. The controller initiates fuel flow from the fuel pump to an ignition system of the gas turbine engine with the starter speed set below a nominal ground-based engine starting speed. The controller monitors a parameter of the gas turbine engine to verify light-off and determines a health status of the fuel pump based on the starter speed at which light-off is achieved.

Technical effects include fuel pump prognostic and health monitoring to ensure that fuel pump performance is adequate to achieve an in-flight restart below a nominal ground-based engine starting speed.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Embodiments use an engine starting system, an ignition system, and at least one parameter, such as an exhaust gas temperature, for determining fuel pump health of a gas turbine engine. Prognostic and health monitoring can be achieved by periodically testing the engine on the ground for the ground conditions to set an equivalent start speed and fuel flow and light-off conditions to assure capability for windmill relight simulated conditions. Windmill relight simulated conditions are used to determine whether a fuel pump can build up sufficient fuel pressure to restart the engine in-flight following an in-flight shutdown event while the engine spool speed is lower than a nominal ground-based engine starting speed.

Embodiments can utilize a combination of a fuel-air ratio, starter/engine speed, and exhaust gas temperature to verify light-off for windmill relight simulated conditions. Alternatively, a minimum threshold fuel pump health test can be performed by modulating the starter at an ultra-low starter speed or slowly stepping the starter speed up to establish the speed at which fuel control pressure is adequate to modulate a metering valve, open a minimum pressure shutoff valve, and provide adequate fuel flow to achieve light-off. Fuel pump health testing can be performed in a maintenance mode as part of periodic testing, in response to a specific request, and/or in response to another test result. Fuel pump health testing can increase operator confidence and may extend minimum inspection/maintenance intervals.

Figure 1:
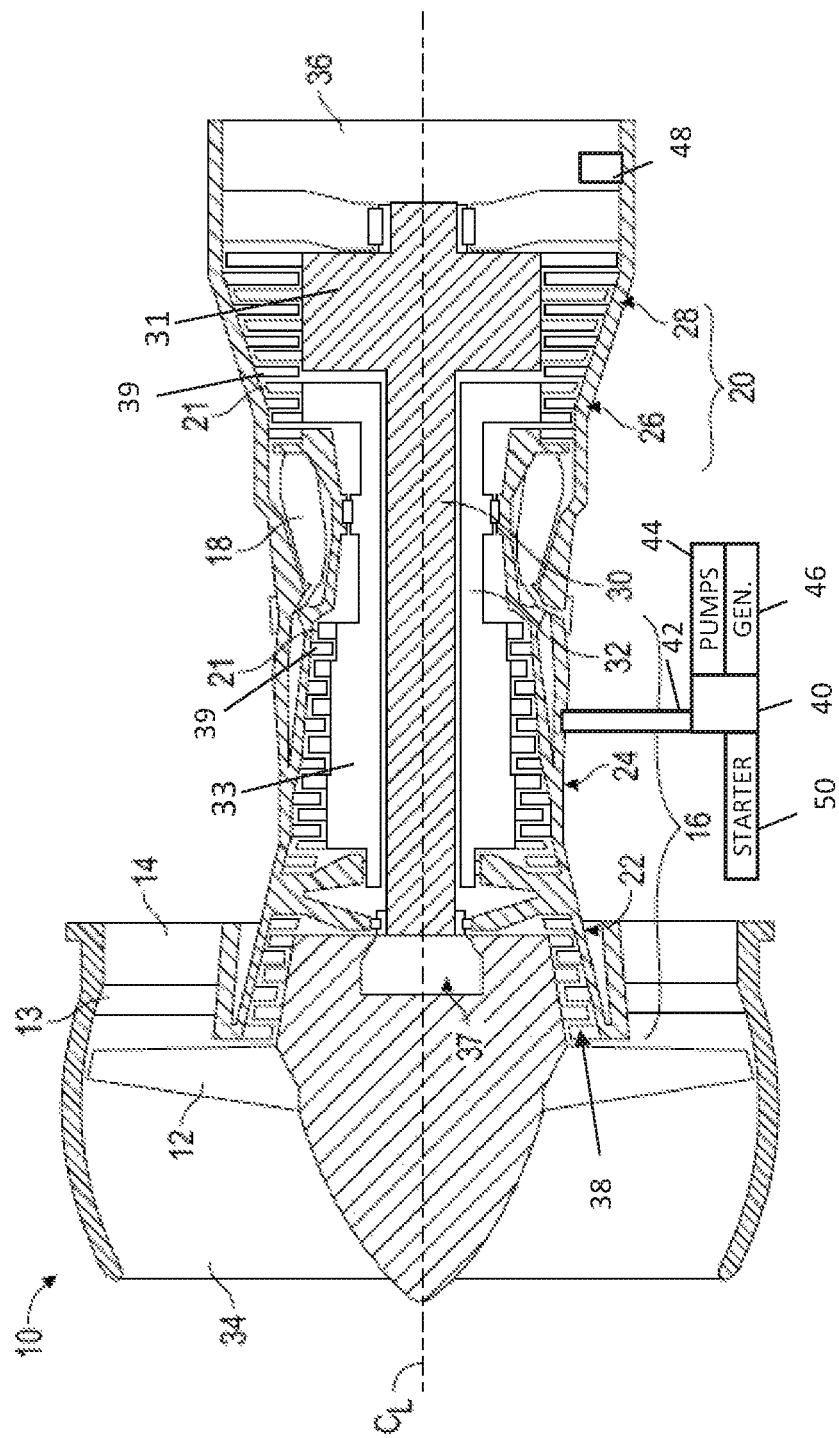
FIG. 1 is a sectional view of one example of a gas turbine engine according to an embodiment.

Referring now to FIG. 1, a cross-sectional view of a gas turbine engine 10, in a turbofan configuration is illustrated. The illustrated gas turbine engine 10 includes a propulsion fan 12 mounted inside a bypass duct 14 upstream of a fan exit guide vane 13. A power core of the engine is formed by a compressor section 16, a combustor 18 and a turbine section 20. Rotor blades (or airfoils) 21 in the compressor section 16 and/or the turbine section 20 are arranged in stages 38 with corresponding stator vane airfoils 39.

In the two-spool, high bypass configuration of FIG. 1, compressor section 16 includes a low pressure compressor 22 (a lower pressure compressor section) and a high pressure compressor 24 (a highest pressure compressor section). The turbine section 20 includes high a pressure turbine 26 and a low pressure turbine 28.

The low pressure compressor 22 is rotationally coupled to the low pressure turbine 28 via a low pressure shaft 30, thereby forming the low pressure spool or low spool 31. High pressure compressor 24 is rotationally coupled to the high pressure turbine 26 via a high pressure shaft 32, forming the high pressure spool or high spool 33.

During operation of the gas turbine engine 10, the fan 12 accelerates air flow from an inlet 34 through bypass duct 14, generating thrust. The core airflow is compressed in the low pressure compressor 22 and the high pressure compressor 24 and then the compressed airflow is mixed with fuel in the combustor 18 and ignited to generate combustion gas.

The combustion gas expands to drive the high and low pressure turbines 26 and 28, which are rotationally coupled to high pressure compressor 24 and low pressure compressor 22, respectively. Expanded combustion gases exit through exhaust nozzle 36, which is shaped to generate additional thrust from the exhaust gas flow. An exhaust gas temperature sensor 48 may detect exhaust gas temperature of the gas turbine engine 10.

In advanced turbofan designs with a low pressure turbine and a high pressure turbine, the low pressure shaft 30 may be coupled to a low pressure compressor and then to a fan 12 via a geared drive mechanism 37, providing fan speed control for increased efficiency and reduced engine noise. Propulsion fan 12 may also function as a first-stage compressor for gas turbine engine 10, with low pressure compressor 22 performing as an intermediate-stage compressor or booster in front of the high pressure compressor. Alternatively, the low pressure compressor stages are absent, and air from fan 12 is provided directly to high pressure compressor 24, or to an independently rotating intermediate compressor spool. The geared drive mechanism 37 can be omitted in various embodiments.

An engine accessory gearbox 40 is mechanically coupled via a tower shaft 42 to a rotating portion of the gas turbine engine 10, such as the high pressure spool 33. Rotation of various engine accessories, such as pumps 44 (e.g., fuel and oil pumps) and electric generators 46 (also referred to as engine generators 46), can be driven through the engine accessory gearbox 40 as depicted schematically in FIG. 1. A starter 50, such as an electric or pneumatic modulating speed controllable starter, can also be coupled to the engine accessory gearbox 40. In embodiments, the starter 50 enables fully modulated (variable) speed control over a starter operating range from zero speed to above a nominal ground-based engine starting speed for a starting spool of the gas turbine engine 10 (e.g., high spool 33).

The gas turbine engine 10 may have a range of different shaft and spool geometries, including one-spool, two-spool and three-spool configurations, in both co-rotating and counter-rotating designs. Gas turbine engine 10 may also be configured as a low bypass turbofan, an open-rotor turbofan, a ducted or un-ducted propeller engine, or an industrial gas turbine.

Figure 2:
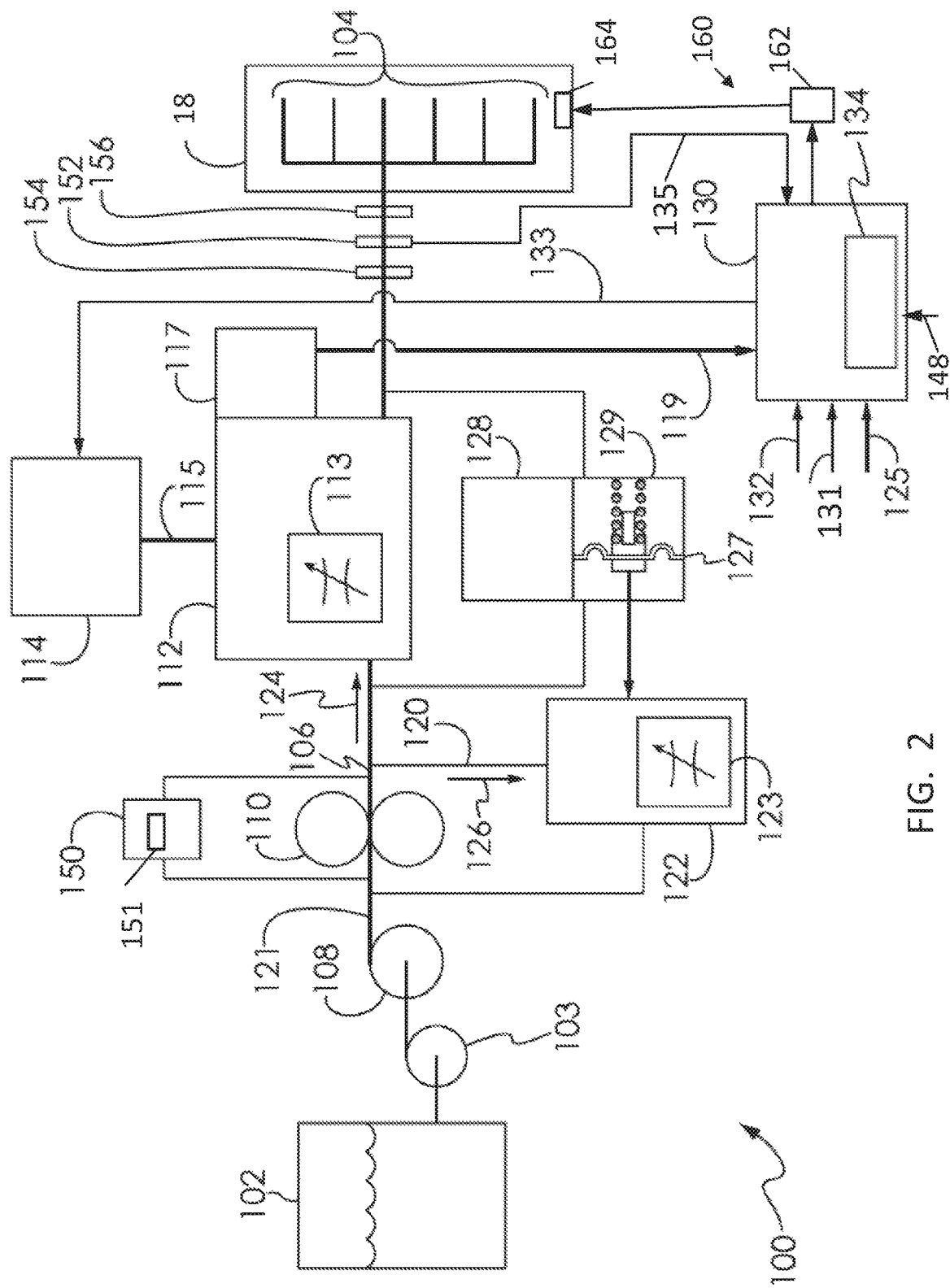
FIG. 2 is a fuel flow schematic for one example of a gas turbine engine according to an embodiment.

Referring now to FIG. 2, a fuel control system 100 for the gas turbine engine 10 of FIG. 1 is shown in accordance with one embodiment. The fuel control system 100 includes a fuel source 102, such as a fuel tank, that stores the fuel supplied to the combustor 18. Fuel is sent through an aircraft booster pump 103 before being sent through an engine booster pump 108. A fuel supply line 106 is coupled to the fuel source 102 and, via various components, delivers the fuel to the combustor 18 via a plurality of fuel nozzles 104. The engine booster pump 108, such as a relatively low horsepower centrifugal pump, and a high pressure fuel pump 110, such as a gear pump or other positive displacement pump, may be used in an embodiment. The fuel pump 110 can be driven by the engine accessory gearbox 40 as one of the pumps 44 of FIG. 1. The pumps 103, 108, 110 are positioned in flow-series in the supply line 106 and draw fuel from the fuel source 102. The engine booster pump 108 provides sufficient suction head for the fuel pump 110. The fuel pump 110 then supplies the fuel, at a relatively high pressure, such as approximately 1200 psig in one non-limiting example, to the remainder of the supply line 106 under normal operating conditions.

In one or more embodiments, an actuation system 150 receives a flow of fuel from a downstream position of the fuel pump 110 to supply fuel for accessory purposes, such as for providing flow and pressure to fueldraulic engine actuators 151. The fuel traveling from the actuation system 150 is then routed to a location upstream of the fuel pump 110. One or more of the fueldraulic engine actuators 151, such as a turbine case cooling valve actuator, may not be active during an engine light-off sequence under normal operating conditions. In some embodiments, a light-off measurement is made by requesting a slew of one of the fueldraulic engine actuators 151 not normally functioning during light-off and reading position feedback to determine how much fuel is displaced to it. This may be utilized when ground conditions require a higher light-off speed and some of the excess fuel flow can be consumed to assure that testing can be performed.

A metering valve 112 is positioned in flow-series in the supply line 106 downstream of the fuel pump 110. The metering valve 112 includes a first variable area flow orifice 113 through which a portion of the fuel in the supply line 106 flows. A metering valve control device 114 is used to adjust the position, also referred to as the stroke, of the metering valve 112, and thus the area of the first variable area flow orifice 113. In the embodiment of FIG. 2, the metering valve 112 is a hydraulically-operated valve and the metering valve control device 114 is an electro-hydraulic servo valve (EHSV) that supplies a metering valve control signal output 115. The control signal output 115 from the metering valve control device 114 is coupled to the metering valve 112 and is used to adjust the position of the metering valve 112 by controlling the flow of operational hydraulic fluid to the metering valve 112.

It will be appreciated that the metering valve 112 and control device 114 described above are only exemplary of a particular embodiment, and that each may be implemented using other types of devices. As one non-limiting example, the metering valve 112 may be an electrically operated valve. In this case, a control device 114, such as an EHSV, may not be used, or the control device 114 could be implemented as an independent controller. In any case, as will be described further below, a fuel flow rate to the combustor 18 is controlled by adjusting the position of the metering valve 112, and thus the area of the first variable area flow orifice 113, via the metering valve control device 114.

A metering valve position sensor 117 is coupled to the metering valve 112 and is used to sense the position of the metering valve 112 and supply a metering valve position signal 119. The position of the metering valve 112 is directly related to the area of the first variable area flow orifice 113, which is directly related to the fuel flow rate to the combustor 18, as described below. The position sensor 117 of one embodiment is a dual channel linear variable differential transformer (LVDT). Other embodiments of the position sensor 117 include any one of numerous position sensing devices known in the art. As a non-limiting example, the position sensor 117 may be a rotary variable differential transformer (RVDT).

A bypass fuel line 120 is connected to the supply line 106 between the fuel pump 110 and the metering valve 112. The bypass fuel line 120 bypasses a portion of the fuel in the supply line 106 back to the inlet of the fuel pump 110. It will be appreciated that the present disclosure is not limited to bypassing a portion of the fuel back to the inlet of the fuel pump 110, but also includes embodiments in which the fuel is bypassed back to the inlet of the booster pump 108, back to the fuel source 102, or back to any position upstream from the fuel pump 110. A discharge fuel line 121 is positioned upstream of the bypass fuel line 120.

In the embodiment of FIG. 2, a pressure regulating valve 122 is positioned in flow-series in the bypass fuel line 120, and includes a second variable area flow orifice 123 through which fuel in the bypass fuel line 120 flows. Thus, as indicated by the flow arrows in FIG. 2, a first fraction 124 of the fuel in the supply line 106 is directed through the metering valve 112, and a second fraction 126 is directed through the pressure regulating valve 122. In the embodiment of FIG. 2, the absolute (and relative) magnitudes of the first fraction 124 and second fraction 126 are controlled by adjusting the areas of the first 113 and the second 123 variable area flow orifices.

The position of the pressure regulating valve 122, and thus the area of the second variable area flow orifice 123, is adjusted under the control of a pressure differential sensor 128. The pressure differential sensor 128 is configured to sense the differential pressure (ΔP) between the inlet and outlet of the metering valve 112. The pressure differential sensor 128, which is coupled to the pressure regulating valve 122, adjusts the area of the second variable area flow orifice 123 based on the sensed ΔP. In particular, the pressure differential sensor 128, implementing proportional control, adjusts the area of the second variable area flow orifice 123 to maintain a substantially constant, predetermined ΔP across the metering valve 112. In one embodiment, the pressure regulating valve 122 and the pressure differential sensor 128 are combined as a single valve structure.

It will be appreciated that the pressure regulating valve 122 and the pressure differential sensor 128 may be any one of numerous types of valves or sensors known in the art. In one embodiment, the pressure differential sensor 128 and the pressure regulating valve 122 are integrally formed as a thermally-compensated, spring-loaded spool valve. In one embodiment, the pressure differential sensor 128 is coupled to the pressure regulating valve 122 and includes a diaphragm 127 across which the metering valve differential pressure is applied. A spring 129 disposed on one side of the diaphragm 127. The selection of the pressure regulating valve 122 or the pressure differential sensor 128 may be dependent on the fuel control system 100 arrangement. In some embodiments, positioning of the pressure regulating valve 122 can be tracked with respect to variable starter speeds to determine excess flow output of the fuel pump 110 bypassed by the pressure regulating valve 122. This relationship can be used for health monitoring, for instance, if a zero bypass position and characterize bypass flow of the pressure regulating valve 122 versus position is known at acceptance testing. Tracking of excess flow capacity during light-off at lower speeds with variable speed start health testing can be performed in addition to trending during normal starts and during takeoff power conditions at takeoff.

Additionally, one or more embodiments of the present disclosure can include a mass flow meter 152, minimum pressure shutoff valve 154, and a flow divider valve 156 in flow-series downstream from the metering valve 112.

A controller 130, which may be implemented within a gas turbine engine controller, such as a Full Authority Digital Engine Controller (FADEC) or other electronic engine controller (EEC), controls the flow of fuel to the combustor 18. To do so, the controller 130 receives various input signals and controls the fuel flow rate to the combustor 18 accordingly. In particular, the controller 130 receives an input control signal 132 from, for example, throttle control equipment (not illustrated) in the cockpit, the position signal 119 from the position sensor 117, a compressor discharge pressure signal 131 representative of the discharge pressure from the compressor section 16 in the engine 10, and an ambient pressure signal 125 representative of ambient pressure around the system 100. The controller 130 also receives a mass flow meter feedback signal 135 from the mass flow meter 152. The controller 130 also receives an exhaust gas temperature 148 from the exhaust gas temperature sensor 48 of FIG. 1, as well as other signals (not depicted). The controller 130, in response to these signals, supplies a drive signal 133 to the metering valve control device 114. In response to the drive signal 133, the metering valve control device 114, as was described above, adjusts the area of the first variable area flow orifice 113 to obtain the desired flow rate to the combustor 18. The controller 130 can also control an ignition system 160 that energizes an exciter 162 to drive igniters 164 to combust fuel from the fuel nozzles 104 in combustor 18. Memory 134 of the controller 130 stores values, algorithms, maps, and other reference data for calculation and/or retrieval by the controller 130 and other components of the system 100. One of ordinary skill will recognize that, in one or more embodiments of the present disclosure, common software control and evaluation operations such as calculating, receiving, sending, referencing, and determining are steps conducted by the controller 130 with or without using data stored in the memory 134.

The controller 130 includes one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory 134 may include random access memory (RAM), read only memory (ROM), or other electronic, optical, magnetic, or any other computer readable medium onto which is stored data and algorithms in a non-transitory form. The controller 130 can include other interfaces (not depicted), such as various communication interfaces, input/output interfaces, power supplies, and the like. The controller can implement one or more of the processes 200 and 300 as further described with respect to FIGS. 3 and 4.

Figure 3:
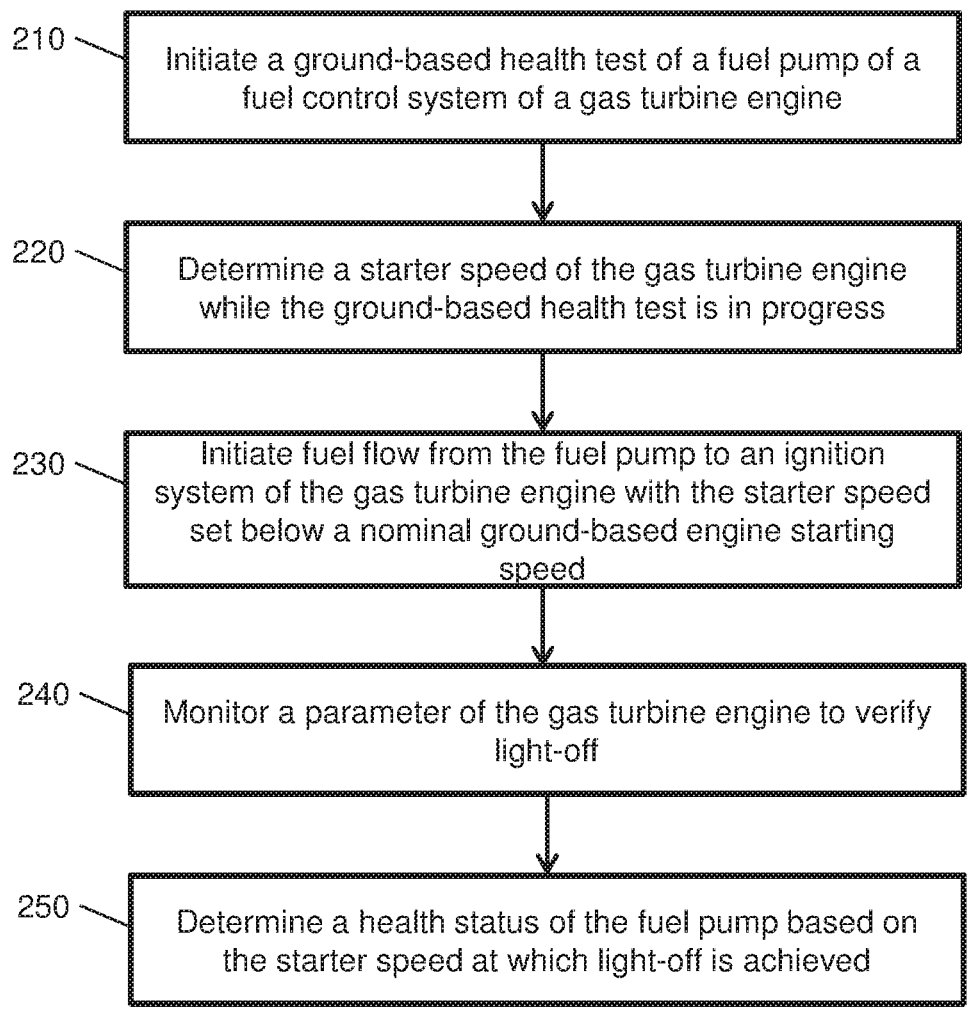
FIG. 3 illustrates a process for determining a health status of a fuel pump according to an embodiment.

FIG. 3 illustrates a process 200 for determining a health status of fuel pump 110 of FIG. 2 according to an embodiment. The process 200 is described with continued reference to FIGS. 1 and 2. Although depicted in a particular order in FIG. 3, it will be understood that blocks of process 200 can be performed in an alternate order, further subdivided, combined, and/or performed with additional steps.

At block 210, a ground-based health test of fuel pump 110 of fuel control system 100 of gas turbine engine 10 is initiated. The ground-based health test can be performed in a maintenance mode of operation while the gas turbine engine 10 is mounted on-wing based on a maintenance interval timer, a maintenance action, or other triggering function.

At block 220, a starter speed of the gas turbine engine 10 is determined while the ground-based health test is in progress. The starter speed can be a direct measurement of rotation speed of the starter 50 or derived from a sensed value, such as a spool speed of the gas turbine engine 10.

At block 230, fuel flow is initiated from the fuel pump 110 to ignition system 160 and combustor 18 of the gas turbine engine 10 with the starter speed set below a nominal ground-based engine starting speed. For example, the starter speed may be set such that the engine speed is about 5% for ground-based health testing, while the nominal ground-based engine starting speed may be about 15% of engine speed. Actual targeted speed values can depend on environmental factors, such as temperature, altitude, and air flow. The starter speed can be set to model a windmilling condition of the gas turbine engine 10 for an in-flight restart of the gas turbine engine 10. A fuel-air ratio can also be set to model the windmilling condition of the gas turbine engine 10. In some embodiments, the starter speed of the gas turbine engine 10 is adjusted during the ground-based health test to modulate a metering valve position of the metering valve 112 of fuel control system 100 and open the minimum pressure shutoff valve 154 of the fuel control system 100. The metering valve position can be set to a position for a required fuel flow at the starter speed to satisfy a stoichiometric fuel-air ratio to achieve light-off. Alternatively, the metering valve position can be set to a position to establish fuel flow based on a capacity of the fuel pump 110 without metering regulation, e.g., a position that is slightly higher than the position for a required fuel flow at the starter speed to satisfy a stoichiometric fuel-air ratio to achieve light-off.

At block 240, a parameter, such as an exhaust gas temperature 148, of the gas turbine engine 10 is monitored to verify light-off. Light-off of the gas turbine engine 10 can be verified based on detecting a step change increase of the exhaust gas temperature 148. Alternatively, a specific temperature value, range, pressure, flow, speed, acceleration, or other indicator can be used to verify light-off.

At block 250, a health status of the fuel pump 110 is determined based on the starter speed at which light-off is achieved. If an initial attempt to achieve light-off does not work at a lower starter speed, the starter speed can be increased to attempt light-off at a higher speed along with making any associated fuel-air ratio changes. Failure to light-off at a modelled windmilling condition can result in a maintenance indicator being set as an early warning of degraded performance of the fuel pump 110. Trending of speed data at which light-off is achieved during various runs of the ground-based health test can be captured and/or communicated for subsequent analysis with respect to specific engine configurations, aircraft configurations, fleet data, and the like.

Figure 4:
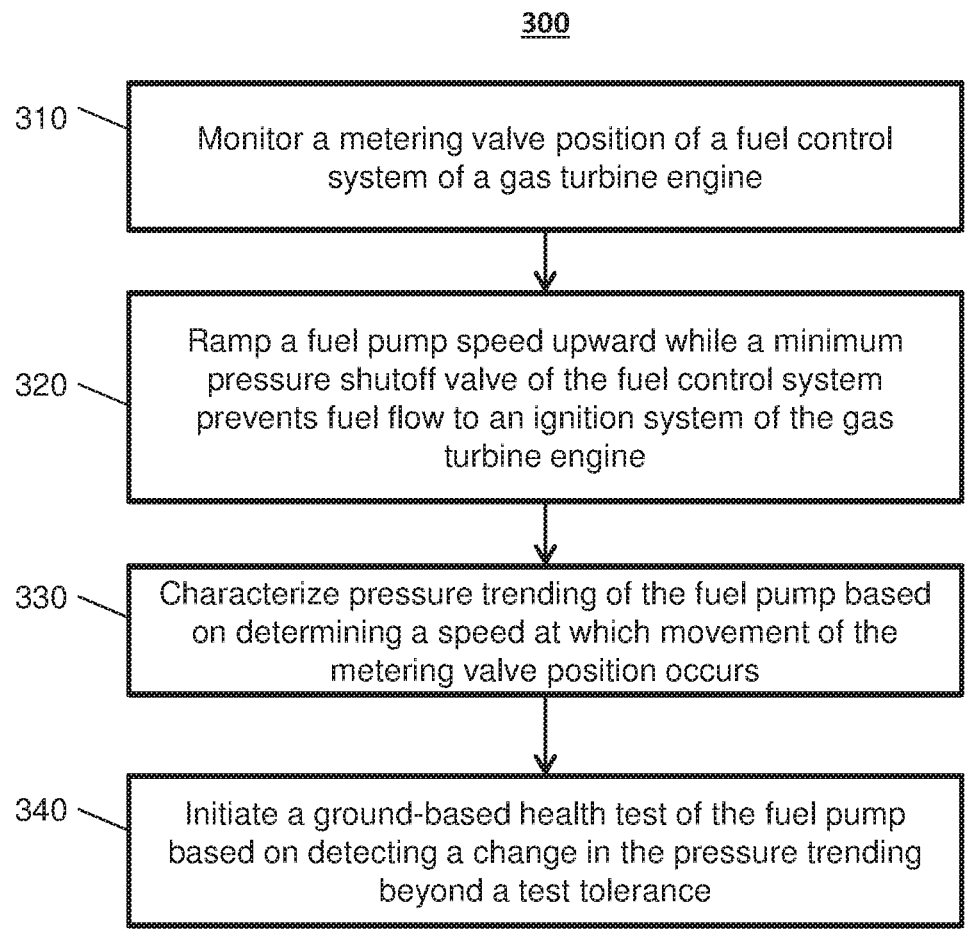
FIG. 4 illustrates a process for characterizing pressure trending of a fuel pump according to an embodiment.

FIG. 4 illustrates a process 300 for characterizing pressure trending of the fuel pump 110 of FIG. 2 according to an embodiment. The process 300 is described with continued reference to FIGS. 1-3. Although depicted in a particular order in FIG. 4, it will be understood that blocks of process 300 can be performed in an alternate order, further subdivided, combined, and/or performed with additional steps.

At block 310, a metering valve position of the metering valve 112 of the fuel control system 100 is monitored. Position sensor 117 can detect the metering valve position relative to one or more position adjustments commanded by a metering valve control device 114. At block 320, a fuel pump speed of the fuel pump 110 is ramped upward while a minimum pressure shutoff valve 154 of the fuel control system 100 prevents fuel flow to an ignition system 160. At block 330, pressure trending of the fuel pump 110 is characterized based on determining a speed at which movement of the metering valve position occurs. Similarly, higher pressure testing and trending may be performed by monitoring the minimum pressure shutoff valve 154 of the fuel control system 100 to determine a minimum pressure that opens the minimum pressure shutoff valve 154. At block 340, the ground-based health test of the fuel pump 110 can be initiated (block 210 of FIG. 3) based on detecting a change in the pressure trending beyond a test tolerance.

The terminology used herein is for the purpose of describing particular embodiments only and is not intended to be limiting of the embodiments. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:
1. A method comprising:
   initiating a ground-based health test of a fuel pump of a fuel control system of a gas turbine engine by a controller of the fuel control system;
   determining, by the controller, a starter speed of the gas turbine engine while the ground-based health test is in progress;
   initiating, by the controller, fuel flow from the fuel pump to an ignition system of the gas turbine engine with the starter speed set below a nominal ground-based engine starting speed, wherein the starter speed of the gas turbine engine is adjusted during the ground-based health test to modulate a metering valve position of a metering valve of the fuel control system and open a minimum pressure shutoff valve of the fuel control system;
   monitoring, by the controller, a parameter of the gas turbine engine to verify light-off based on detecting a change in the parameter indicative of light-off; and determining, by the controller, a health status of the fuel pump based on the starter speed at which light-off is achieved to identify degraded performance of the fuel pump.

2. The method of claim 1, wherein the starter speed is set to model a windmilling condition of the gas turbine engine for an in-flight restart of the gas turbine engine.

3. The method of claim 2, wherein a fuel-air ratio is set to model the windmilling condition of the gas turbine engine.

4. The method of claim 1, wherein the metering valve position is set to a position for a required fuel flow at the starter speed to satisfy a stoichiometric fuel-air ratio to achieve light-off.

5. The method of claim 1, wherein the metering valve position is set to a position to establish fuel flow based on a capacity of the fuel pump without metering regulation.

6. The method of claim 1, further comprising: making a light-off measurement based on requesting a slew of a fueldraulic engine actuator not normally functioning during light-off and reading a position feedback to determine an amount of fuel displaced.

7. The method of claim 1, further comprising tracking a position of a pressure regulating valve with respect to variable starter speeds to determine excess flow output of the fuel pump bypassed by the pressure regulating valve.

8. The method of claim 1, further comprising:
monitoring the metering valve position;
ramping a fuel pump speed upward while the minimum pressure shutoff valve prevents fuel flow to an ignition system;
characterizing pressure trending of the fuel pump based on determining a speed at which movement of the metering valve position occurs; and
initiating the ground-based health test of the fuel pump based on detecting a change in the pressure trending beyond a test tolerance.

9. The method of claim 1, further comprising: monitoring the minimum pressure shutoff valve to determine a minimum pressure that opens the minimum pressure shutoff valve and characterize pressure trending of the fuel pump.

10. A fuel control system of a gas turbine engine, the fuel control system comprising:
a minimum pressure shutoff valve;
a metering valve;
a fuel pump; and
a controller operable to:
initiate a ground-based health test of the fuel pump;
determine a starter speed of the gas turbine engine while the ground-based health test is in progress;
initiate fuel flow from the fuel pump to an ignition system of the gas turbine engine with the starter speed set below a nominal ground-based engine starting speed, wherein the starter speed of the gas turbine engine is adjusted during the ground-based health test to modulate a metering valve position of the metering valve and open the minimum pressure shutoff valve of the fuel control system;
monitor a parameter of the gas turbine engine to verify light-off based on detecting a change in the parameter indicative of light-off; and
determine a health status of the fuel pump based on the starter speed at which light-off is achieved to identify degraded performance of the fuel pump.

11. The fuel control system of claim 10, wherein starter speed is set to model a windmilling condition of the gas turbine engine for an in-flight restart of the gas turbine engine.

12. The fuel control system of claim 11, wherein a fuel-air ratio is set to model the windmilling condition of the gas turbine engine.

13. The fuel control system of claim 10, wherein the metering valve position is set to a position for a required fuel flow at the starter speed to satisfy a stoichiometric fuel-air ratio to achieve light-off.

14. The fuel control system of claim 10, wherein the metering valve position is set to a position to establish fuel flow based on a capacity of the fuel pump without metering regulation.

15. The fuel control system of claim 10, wherein the controller is further operable to make a light-off measurement based on requesting a slew of a fueldraulic engine actuator not normally functioning during light-off and reading a position feedback to determine an amount of fuel displaced.

16. The fuel control system of claim 10, wherein the controller is further operable to track a position of a pressure regulating valve with respect to variable starter speeds to determine excess flow output of the fuel pump bypassed by the pressure regulating valve.

17. The fuel control system of claim 10, wherein the controller is further operable to:
monitor the metering valve position;
ramp a fuel pump speed upward while the minimum pressure shutoff valve prevents fuel flow to an ignition system;
characterize pressure trending of the fuel pump based on determining a speed at which movement of the metering valve position occurs; and
initiate the ground-based health test of the fuel pump based on detecting a change in the pressure trending beyond a test tolerance.

18. The fuel control system of claim 10, wherein the controller is further operable to monitor the minimum pressure shutoff valve to determine a minimum pressure that opens the minimum pressure shutoff valve and characterize pressure trending of the fuel pump.

* * * * *